(12) United States Patent
Austerhoff et al.

(10) Patent No.: US 7,427,000 B2
(45) Date of Patent: Sep. 23, 2008

(54) COMPRESSED GAS TANK FOR A MOTOR VEHICLE

(75) Inventors: Norbert Austerhoff, Paderborn (DE); Joachim Perske, Salzkotten (DE); Jens Bendler, Paderborn (DE); Rafael Peters, Lippstadt (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 819 days.

(21) Appl. No.: 10/882,992

(22) Filed: Jul. 1, 2004

(65) Prior Publication Data

US 2005/0011891 A1    Jan. 20, 2005

(30) Foreign Application Priority Data

Jul. 2, 2003    (DE) ................. 103 29 990

(51) Int. Cl.
B65D 6/00    (2006.01)
B65D 8/00    (2006.01)

(52) U.S. Cl. ...................... 220/4.14; 220/562

(58) Field of Classification Search ........ 220/4.12–4.14, 220/4.24, 4.25, 562–565, 581, 584, 592, 220/651, 653, 669

See application file for complete search history.

(56) References Cited

U.S. PATENT DOCUMENTS

| 2,970,719 | A | * | 2/1961 | Brady, Jr. | ................. 220/678 |
| 3,912,103 | A | * | 10/1975 | Gerhard | ................. 220/1.5 |
| 6,220,779 | B1 | * | 4/2001 | Warner et al. | ........... 403/381 |
| 6,412,650 | B1 | * | 7/2002 | Warner | ................. 220/4.12 |

FOREIGN PATENT DOCUMENTS

WO    WO 9206324 A1 *    4/1992

* cited by examiner

*Primary Examiner*—Anthony D Stashick
*Assistant Examiner*—Harry A Grosso
(74) *Attorney, Agent, or Firm*—Henry M. Feiereisen; Ursula B. Day

(57) ABSTRACT

A compressed gas tank for a motor vehicle includes a metallic gas container having opposite container walls which are constructed with a profiling to increase rigidity, and at least one tie element extending across the gas container. The profiling is realized by stamping a plurality of wall portions from the plane of the container walls to assume a convex and/or concave configuration.

17 Claims, 4 Drawing Sheets

COMPRESSED GAS TANK FOR A MOTOR VEHICLE

CROSS-REFERENCES TO RELATED APPLICATIONS

This application claims the priority of German Patent Application, Serial No. 103 29 990.4, filed Jul. 2, 2003, pursuant to 35 U.S.C. 119(a)-(d), the disclosure of which is incorporated herein by reference.

BACKGROUND OF THE INVENTION

The present invention relates, in general, to a compressed gas tank for a motor vehicle.

For some time, the automobile industry has undertaken efforts to replace currently used liquid fuels, such as gasoline or diesel fuel, with gaseous propellants for ecological reasons, because gaseous propellants can be operated with little release of pollutants. Examples of propellants that are predominantly envisioned at this time include hydrogen or natural gas.

In order to ensure an adequate range for gas-propelled motor vehicles, it is required to sufficiently compress gas to enable installation of a compressed gas tank in the available space in the motor vehicle. However, the installation space available in motor vehicles is very limited for compressed gas tanks. Conventional compressed gas bottles allow only poor exploitation of the existing installation volume, i.e. only a very small amount of compressed gas can be made available so that the driving range of a motor vehicle is too short.

Containers for compressed gas are normally made of steel. For strength reasons, the containers have a spherical or cylindrical shape with spherically configured end faces. To keep the container weight as low as possible, the wall thickness of the gas container is increasingly made thinner. While current joining techniques are able to maintain sufficient tightness of the gas container, there is the problem of reaching the limit of the admissible strength of the gas container at the prevailing high internal container pressure.

It would therefore be desirable and advantageous to provide an improved compressed gas tank which obviates prior art shortcomings and which is constructed to maximize the available installation space in a motor vehicle while still reliably meeting the safety requirements demanded from a gas container.

SUMMARY OF THE INVENTION

According to one aspect of the present invention, a compressed gas tank for a motor vehicle includes a metallic gas container having opposite container walls which are constructed with a profiling to increase rigidity, and at least one tie element extending across the gas container.

The present invention resolves prior art problems by profiling the structure of the gas container in such a manner as to reliably withstand the high internal pressure. In addition, the internal pressure is absorbed by the provision of internal tie elements. This construction enables a flexible configuration of the gas container so that the available installation space in a motor vehicle can be utilized in an optimum manner, while satisfying the high safety criteria demanded from gas containers.

According to another feature of the present invention, the container walls define a plane and have a plurality of wall portions which are stamped from the plane to assume a convex and/or concave configuration to realize the profiling. In this way, the structure of the container walls becomes globoid. In other words, the radius of the individual wall portions forms a spherical shape. Suitably, the container walls have a pulvinated (cushion-shaped) profile, with the gas container being stiffened by internal tie elements of a number suited to the respective strength requirements.

The gas container may be made in one piece from sheet metal. Currently preferred is however a construction, whereby the gas container is comprised of an upper shell and a lower shell which are connected about their circumferential edges. The edges of the upper and lower shells may be joined to one another through butt welding, or the edges of the upper and lower shells may also overlap. The provision of shell construction of metal sheet is economical, cost-efficient and light-weight.

According to another feature of the present invention, the tie element may have a rod-shaped configuration. Currently preferred is a configuration of the tie element having ends formed with anchoring heads for passage through openings in the container walls and joining to the container walls in gastight manner. Suitably, the tie element may be formed with stop members for attachment to the container walls.

This type of compressed gas tank can be made cost-effectively and economically on a large scale as follows: Upper and lower shells are made in a pressing tool. Then, the openings for passage of the tie elements are formed. When assembling the gas container, the tie elements are first guided through the lower shell before placement of the upper shell. Both shells are then welded together by a circumferentially welded seam. Finally, the tie elements are connected to the upper and lower shells such as to reliably withstand prevailing internal pressure during operation and satisfying a sufficient safety factor. Of course, other connections and openings in the gas container, e.g. ports for filling or withdrawal of gas, or connections for safety valves and sensors, can be made during the fabrication process.

According to another feature of the present invention, opposite openings in the container walls for securement of the tie element may be made of different size. In this way, the tie element is rod-shaped to resemble the shape of a nail having one end provided with a wider anchoring head and another end constructed in the form of a radially formed circumferential collar as stop member which is continued in axial direction by a pin. This type of tie element is guided through the larger opening in one shell, e.g. the lower shell, until resting with its anchoring head against the container wall from the outside. The anchoring head is then joined to the container wall. The other shell, e.g. the upper shell, bears with its inner side against the stop member on this side. The pin is then heated and shaped radially into the anchoring head, just like a rivet. Subsequently, this anchoring head of the tie element is tightly welded to the container wall.

Of course, both ends of the tie element may be configured substantially identical with a circumferential collar as stop member with continuing axial pin. The pins are guided through the openings in the upper and lower shells and then subjected to a forging process and welded, as described above.

Shaping of the anchoring heads by heat may suitably be realized through inductive heating which can be integrated in the fabrication process in a cost-efficient manner and can be controlled in a fully automated manner.

According to another feature of the present invention, the tie element may be joined to the container walls through intervention of a seal. The seal is hereby constructed to adjust to the hot-forming of the anchoring head. Examples of a suitable seal include heat-resistant metallic seal or hot-melt seal in the form of a solder of metallic base. The provision of a hot-melt seal has the advantage that adhesive forces can be used in addition to the form-fit for securement of the tie element.

As described above, the tie element may be rod-shaped with varying end configurations. As an alternative, the tie element may also have two length portions which are connectable to one another. An example of a suitable connection includes a thread connection between the length portions to form a tie rod. Another example involves the formation of a force-fitting and/or form-fitting locked connection between the length portions.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
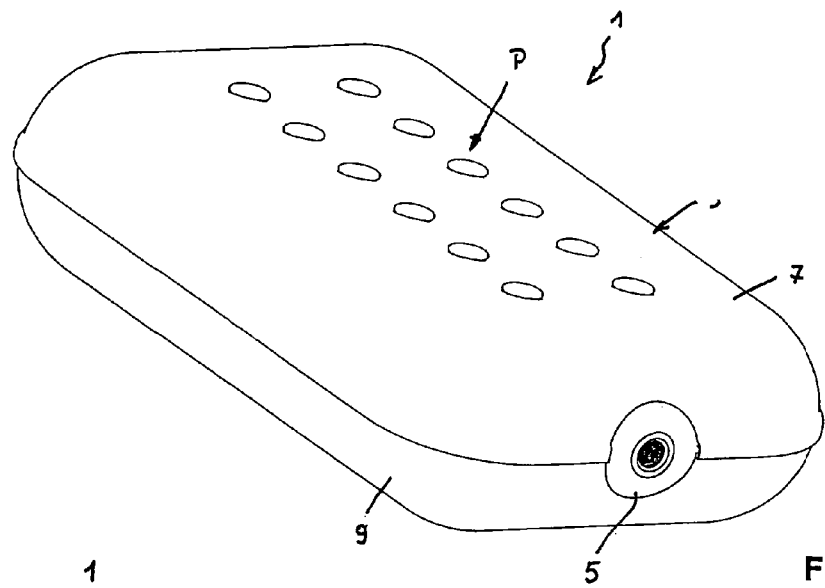
FIG. 1 is a perspective view of a first embodiment of a compressed gas tank according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a perspective view of a first embodiment of a compressed gas tank according to the present invention, generally designated by reference numeral 1 and including a metallic gas container 3 having a connection port 5 for introduction or withdrawal of compressed gas into or from the interior of the gas container 3. The gas container 3 has an elongated generally rectangular configuration with rounded side regions. Of course, the gas container 3 may have any suitable shape to conform to the available installation space in a motor vehicle. In this way, the existing installation space can be used in an optimum manner.

Figure 2:
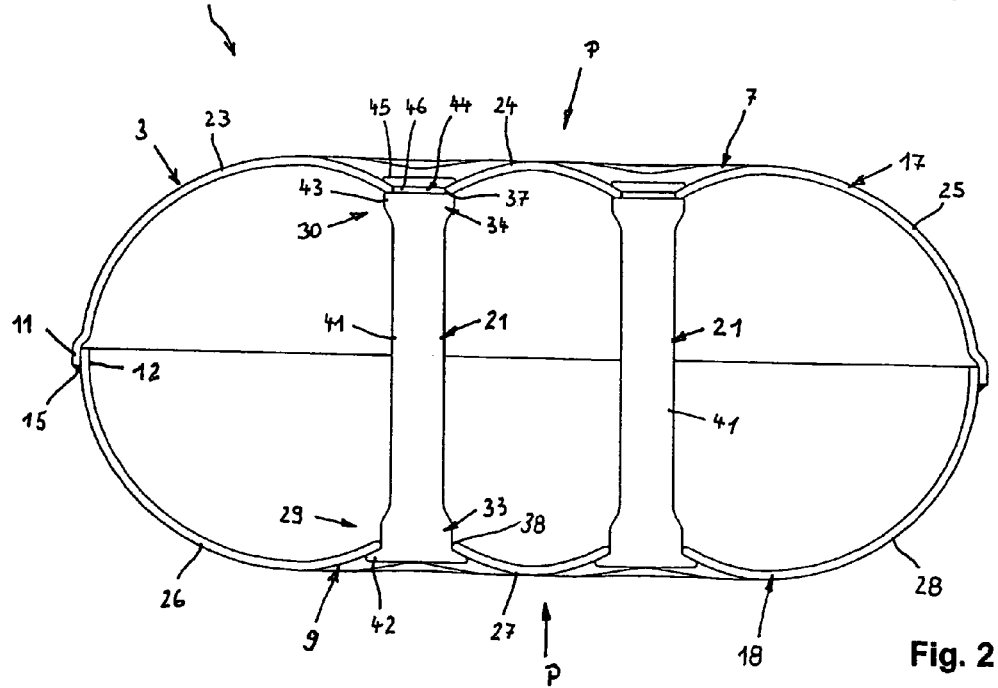
FIG. 2 is a sectional view of the compressed gas tank of FIG. 1.

As shown in conjunction with FIG. 2, the gas container 3 is comprised of an upper shell 7 and a lower shell 9 which are connected about their circumferential edges 11, 12, e.g. by a continuous welded seam 15. In the non-limiting example of FIG. 2, the edge 11 of the upper shell 7 is drawn outwardly to overlap the lower shell 9 by about a thickness of the container wall of the lower shell 9.

As shown in particular in FIG. 2, which is a sectional view of the compressed gas tank 1, opposite container walls 17, 18 of the upper and lower shells 7, 9 of the gas container 3 are formed with a profiling P to increase the stiffness or rigidity of the gas container 3. In addition, the container walls 17, 18 are connected to one another via a number of internal tie elements, generally designated by reference numeral 21 and extending across the interior of the gas container 3.

The profiling P provides the gas container 3 with a pulvinated or mattress-like appearance and is realized by several wall portions 23, 24, 25, 26, 27, 28 which are stamped out from the plane of the container walls 17, 18 to have a convex or concave configuration. The wall portions 23, 24, 25, 26, 27, 28 are spatially curved spherically or approximate a globoid shape. As a consequence, the structure of the gas container 3 in the wall portions 23, 24, 25, 26, 27, 28 is approximated to the globoid shape or cylindrical shape that is ideal to withstand highly compressed gas.

The internal pressure is further absorbed by the tie elements 21 inside the gas container 3. Each tie element 21 is configured in the shape of a tie rod 41 having opposite ends 29, 30 in the form of anchoring heads 33, 34 which are received in openings 37, 38 of the container walls 17, 18 and joined there to the container walls 17, 18. The anchoring head 33 at end 29 is hereby wider in relation to the tie rod 41 and formed with a stop member 42 in the form of a circumferential collar. The anchoring head 34 on the other end 30 of the tie element 21 is also provided with a circumferential radial inner stop member 43 which carries in initial state an axial pin 44. The purpose of the pin 44 will be described in more detail furtherbelow with reference to FIG. 5.

The openings 38 in the lower shell 9 have a diameter which is greater than the diameter of the openings 37 in the upper shell 7 and large enough to allow passage of the tie elements 21 and its stop members 43. During assembly of the compressed gas tank 1, the tie elements 21 are inserted through the openings 38 of the lower shell 9, until the stop member 42 of the anchoring head 33 contacts the container wall 18 from the outside. Subsequently, the upper shell 7 is placed upon the lower shell 9 until the container wall 17 of the upper shell 7 rests upon the stop members 43. The pins 44 project hereby through the openings 37 in the upper shell 7. Lower and upper shells 9, 7 are then welded together along their edges 11, 12 by the circumferentially welded seam 15.

Subsequently, the pins 44 are heated, preferably inductively, and hammered or pressed together into the shape of the anchoring head 34 with circumferential radial collar 45. During the forming process, the stop member 43 provides an abutment for the applied forces. The container wall 17 of the upper shell 7 is then held form-fittingly or by force-lockingly in an annular groove 46 formed between the stop member 43 and the radial collar 45. Thereafter, the anchoring heads 33, 34 are welded tightly to the upper shell 7 and the lower shell 9, respectively.

If necessary, a sealing material may be integrated in the connection zone between the anchoring heads 33, 34 and the container walls 17, 18. Examples of a suitable sealing material include a metallic seal or a hot-melt seal.

Figure 3:
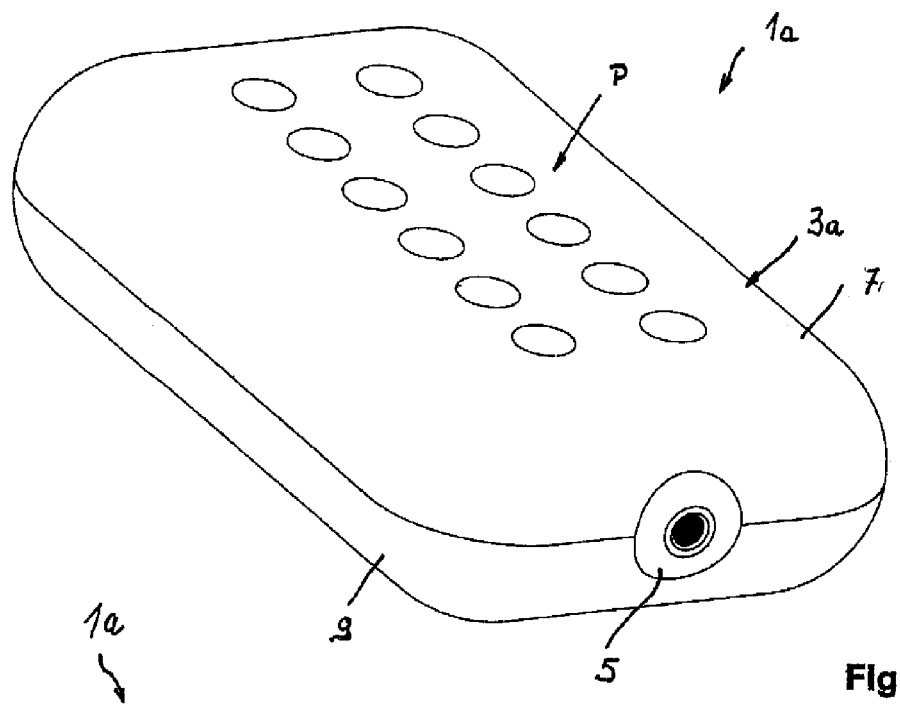
FIG. 3 is a perspective view of a second embodiment of a compressed gas tank according to the present invention.
Figure 4:
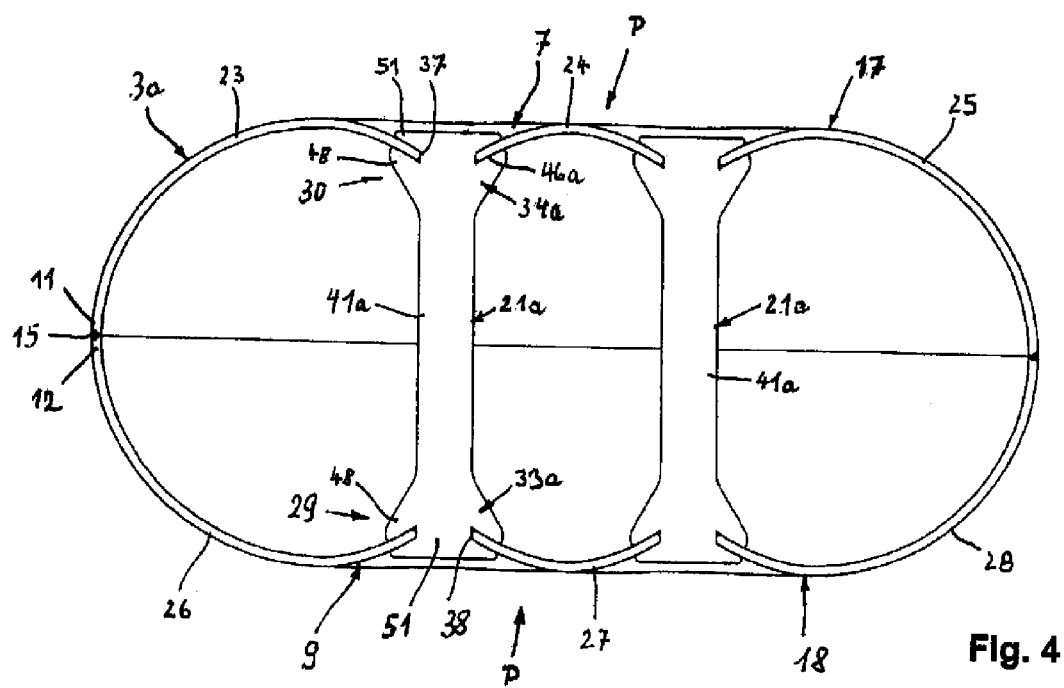
FIG. 4 is a sectional view of the compressed gas tank of FIG. 3.
Figure 5:
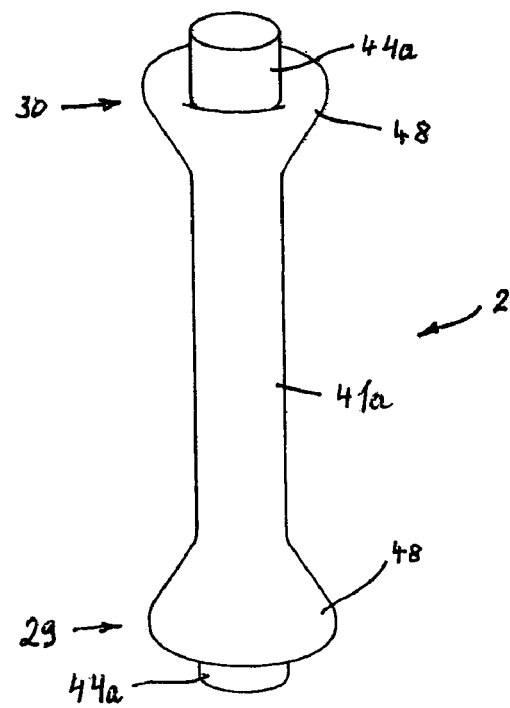
FIG. 5 is a side view, on an enlarged scale, of one embodiment of a tie element for use in a compressed gas tank according to the present invention.

Turning now to FIG. 3, there is shown a perspective view of a second embodiment of a compressed gas tank according to the present invention, generally designated by reference numeral 1a. In describing the embodiment of FIG. 3, parts corresponding with those in FIG. 1 will generally be identified by corresponding reference numerals followed by an "a". The description below will generally center on the differences between the embodiments. In this embodiment, the edge 11 of the upper shell 7 of the gas container 3a and the edge 12 of the lower shell 9 form a butt joint and are welded together there by circumferential seam 15. As shown in particular in FIG. 4, which is a sectional view of the compressed gas tank 1a, each of the tie elements 21a is configured as a tie rod 41a whose opposite ends 29, 30 are formed with anchoring heads 33a, 34a, each having an inner stop member 48 in the form of a circumferential collar. Connected to the stop member 48 is initially a pin 44a, as shown in FIG. 5, before shaping the pins 44a into the anchoring heads 33a, 34a.

The compressed gas tank 1a is made as follows: The pins 44a are inserted through the openings 37, 38 of the upper and lower shells 7a, 9a. The openings 37, 38 are here of same size. The pins 44a of the tie elements 21a are then heated, and shaped, as described above in connection with the anchoring head 34, into the anchoring heads 33a, 34a with a circumferential radial collar 51. Inner stop member 48 of the anchoring head 33a, 34a forms hereby an abutment or forging die. As a result of the forging process, a conical groove 46a is formed between the inner stop member 48 and the outer radial collar 51 to circumscribe the area of the container walls 17, 18 that surrounds the openings 37, 38. Subsequently, the anchoring heads 33a, 34a are welded tightly with the container walls 17, 18.

Figure 6:
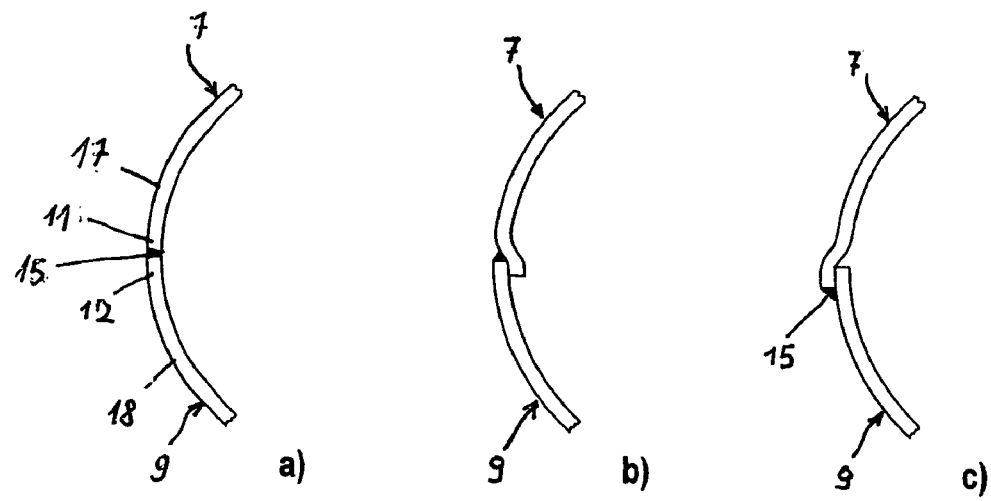
FIG. 6a is a schematic illustration of a first variation of the joining area between an upper shell and a lower shell of a compressed gas tank according to the present invention.
FIG. 6b is a schematic illustration of a second variation of the joining area between an upper shell and a lower shell of a compressed gas tank according to the present invention.
FIG. 6c is a schematic illustration of a third variation of the joining area between an upper shell and a lower shell of a compressed gas tank according to the present invention.

Referring now to FIGS. 6a, b, c, there are shown three variations of the configuration of the joining areas between the upper and lower shells 7, 9. In FIG. 6a, the container walls 17, 18 of the upper and lower shells 7, 9 form a butt joint, as shown also, by way of example, in the compressed gas tank of FIGS. 3, 4. In the variation of FIG. 6b, the upper shell 7 is drawn inwardly in the joining area by the thickness of the container wall 18 of the lower shell 9. The upper shell 7 can be placed, like a cover, upon the lower shell 9, and subsequently, the upper and lower shells 7, 9 are circumferentially welded together from outside. This is currently a preferred variation. FIG. 6c shows the joining area of FIG. 2, with the edge 11 of the upper shell 7 being drawn outwardly. Also in this variation, upper and lower shells 7, 9 are circumferentially welded together.

Figure 7:
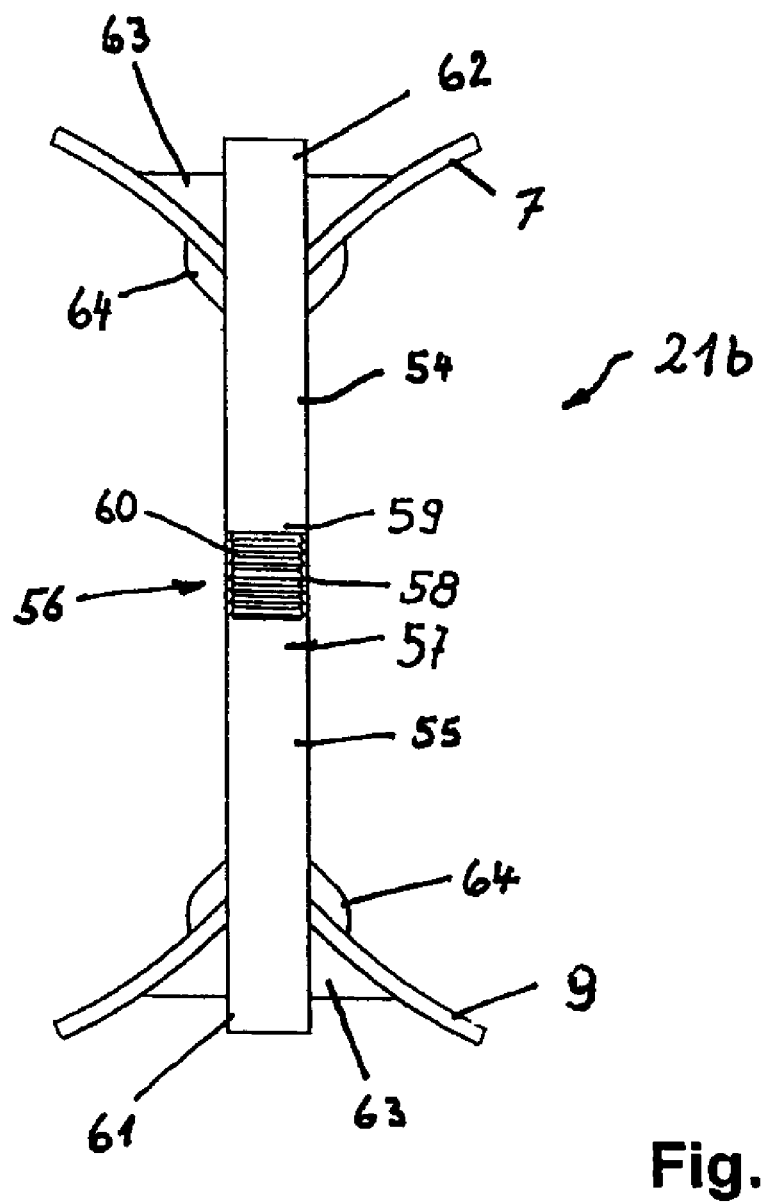
FIG. 7 is a side view of another embodiment of a tie element for use in a compressed gas tank according to the present invention.

Referring now to FIG. 7, there is shown a side view of another embodiment of a tie element, generally designated by reference numeral 21b, for use in a compressed gas tank according to the present invention. The tie element 21b is comprised of two length portions 54, 55 which are connectable to one another, for example by a thread connection 56. The length portion 54 has hereby an end section 57 with an external thread 58, whereas the length portion 55 has a confronting end section 59 formed with a complementary internal thread 60. The other free end 61 of the length portion 55 and the other free end 62 of the length portion 54 are provided with form-fitting inlays 63, 64 by which the tie element 21b can be connected gastight and joined with the upper and lower shells 7, 9.

Although not shown in detail in the drawing, the tie elements may also have a rope-like configuration to traverse the gas container for bracing the container walls 17, 18. The anchoring heads of such a rope-like tie element are pulled through the openings 37, 38, and then the tie element can be tightened. Subsequently, the anchoring heads are connected to the container wall 17, 18 and sealed. Welding is also in this case an especially appropriate joining operation.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A compressed gas tank for a motor vehicle, comprising:
   a metallic gas container having opposite container walls which are constructed with a profiling to increase rigidity; and
   at least one tie element extending across the gas container, wherein the tie element has opposite ends configured with anchoring heads for passage through openings in the container walls and joining to the container walls in gastight manner, at least one of the anchoring heads configured to have an inner stop member and an outer radial collar realized through shaping of a pin, which extends from the stop member, to form between the stop member and the radial collar a groove for receiving a one of the container walls.

2. The compressed gas tank of claim 1, wherein the container walls define a plane and have a plurality of wall portions which are stamped from the plane to assume a convex and/or concave configuration to realize the profiling.

3. The compressed gas tank of claim 2, wherein the wall portions have a pulvinated configuration.

4. The compressed gas tank of claim 1, wherein the gas container has an upper shell and a lower shell connected about their circumferential edges.

5. The compressed gas tank of claim 4, wherein the edge of the upper shell is drawn outwardly to overlap the edge of the lower shell by about a wall thickness of the lower shell.

6. The compressed gas tank of claim 4, wherein the edge of the upper shell is drawn inwardly to overlap the edge of the lower shell by about a wall thickness of the lower shell.

7. The compressed gas tank of claim 4, wherein the edges of the upper and lower shells are connected by a welded butt joint.

8. The compressed gas tank of claim 1, wherein the tie element has a rod-shaped configuration.

9. The compressed gas tank of claim 1, wherein opposing ones of the openings in the container walls have different size.

10. The compressed gas tank of claim 1, wherein the tie element is joined to the container walls through intervention of a seal.

11. The compressed gas tank of claim 10, wherein the seal is a heat-resistant metallic seal.

12. The compressed gas tank of claim 9, wherein the seal is a hot-melt seal in the form of a solder of metallic base.

13. The compressed gas tank of claim 1, wherein the tie element has two length portions connectable to one another.

14. The compressed gas tank of claim 13, wherein the length portions are screwed together.

15. The compressed gas tank of claim 13, wherein the length portions are locked together.

16. The method of claim 8, wherein the tie element has a tie rod extending between the anchoring heads, said at least one anchoring head having a width which is wider than a width of the tie rod.

17. The method of claim 1, wherein the groove is configured to receive adjacent container walls in spaced-apart relationship.

* * * * *